United States Patent [19]
Lightle et al.

[11] Patent Number: 5,753,161
[45] Date of Patent: May 19, 1998

[54] VACUUM EXTRUSION SYSTEM AND METHOD

[75] Inventors: Rodger D. Lightle, Canton; Robert L. Sadinski, Tallmadge; Robert M. Lincoln, North Canton, all of Ohio

[73] Assignee: Owens-Corning Fiberglas Technology, Inc., Toledo, Ohio

[21] Appl. No.: 696,472

[22] Filed: Aug. 14, 1996

[51] Int. Cl.[6] ................................................ B29C 47/88
[52] U.S. Cl. .................... 264/45.9; 264/40.6; 264/48; 264/51; 264/101; 264/178 R; 425/4 C; 425/71; 425/73; 425/325; 425/388; 425/817 C
[58] Field of Search .................. 264/45.9, 48, 348, 264/51, 101, DIG. 78, 178 R, 40.6; 425/71, 388, 73, 74–75, 325, 4 C, 817 C

[56] References Cited

U.S. PATENT DOCUMENTS

| | | |
|---|---|---|
| 1,990,434 | 2/1935 | Kohler . |
| 2,987,768 | 6/1961 | Given . |
| 3,295,163 | 1/1967 | Bachus ............................ 264/348 |
| 3,428,726 | 2/1969 | Moss .............................. 264/348 |
| 3,584,108 | 6/1971 | Nelson et al. . |
| 3,704,083 | 11/1972 | Phipps . |
| 3,822,331 | 7/1974 | Cogliano . |
| 4,044,084 | 8/1977 | Phipps . |
| 4,199,310 | 4/1980 | Phipps . |
| 4,211,739 | 7/1980 | Phipps ............................ 264/101 |
| 4,234,529 | 11/1980 | Phipps . |
| 4,247,276 | 1/1981 | Phipps . |
| 4,271,107 | 6/1981 | Phipps . |
| 4,445,837 | 5/1984 | Cisar et al. ..................... 264/101 |
| 4,454,082 | 6/1984 | Cisar et al. ..................... 264/101 |
| 4,469,652 | 9/1984 | Cisar et al. ..................... 264/51 |
| 4,486,369 | 12/1984 | Schafler et al. . |
| 4,487,731 | 12/1984 | Kobayashi . |
| 4,585,603 | 4/1986 | Furuta et al. ................... 264/45.9 |
| 4,783,291 | 11/1988 | Pagan . |
| 5,120,481 | 6/1992 | Brackman et al. ............. 264/51 |
| 5,340,295 | 8/1994 | Preiato et al. .................. 425/71 |

FOREIGN PATENT DOCUMENTS

| 0260948A3 | 9/1987 | European Pat. Off. . |
| 0260949A3 | 9/1987 | European Pat. Off. . |

*Primary Examiner*—Jeffery R. Thurlow

[57] ABSTRACT

A horizontal vacuum extrusion line includes a fixed bulkhead, a die inside the bulkhead, a telescoping vacuum chamber section and a fixed chamber section. A dam in the fixed section forms a pond for immersion cooling of the extrudate. A truss extends from the dam to the bulkhead supporting, shaping and calibration equipment and extends through the telescoping section. Fluid pressurizable seals at each end of the telescoping section are operable after the telescoping section is closed against the bulkhead and the telescoping and fixed sections are locked together. The telescoping section provide a more compact line and easier access to the complex equipment downstream of the die. The extrudate from the die passes down into the pond and then through an orifice in a hood projecting from the chamber into a lower level portion of the pond exposed to atmosphere. The hood also includes a tractor drive to push the extrudate through the underwater orifice. The hood and its contents are accessible through the atmospheric pond. A tractor haul-off and the tractor drive in the hood are the only extrudate drives between the calibration equipment and atmosphere. The higher level of the pond within the chamber downstream of the dam is controlled by a valve in turn controlling the output of a pump. The valve control senses the pond level and operates independently of the vacuum controls.

48 Claims, 5 Drawing Sheets

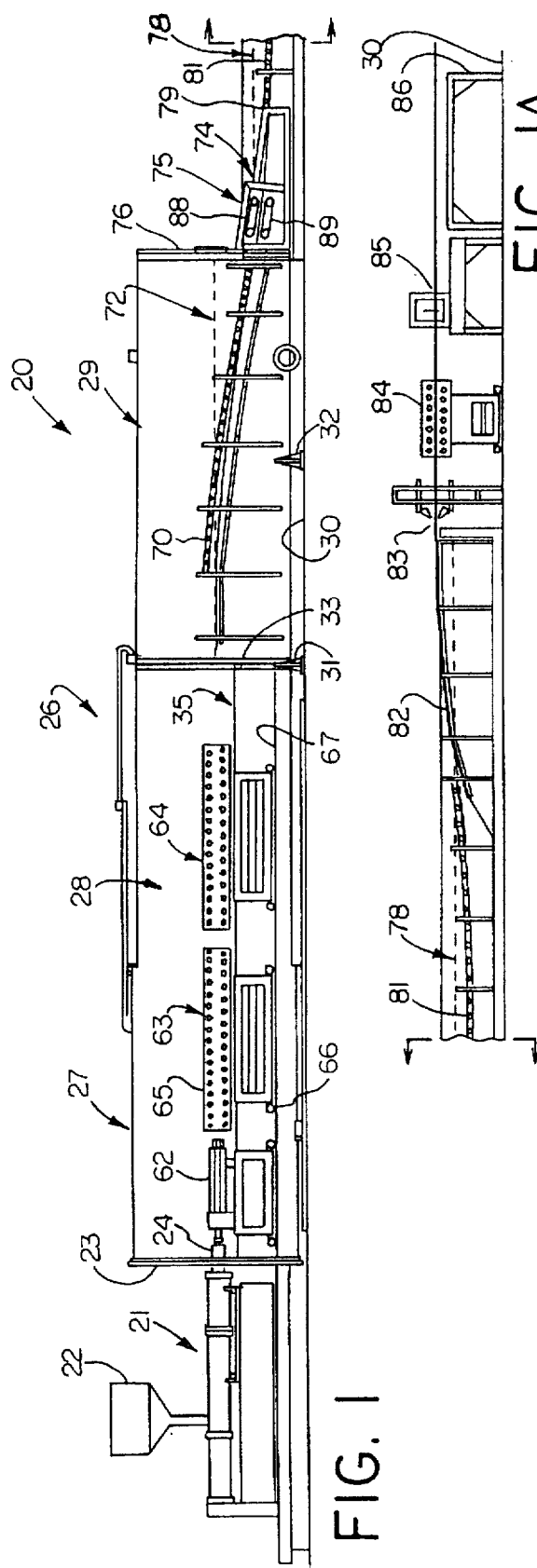
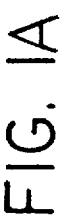
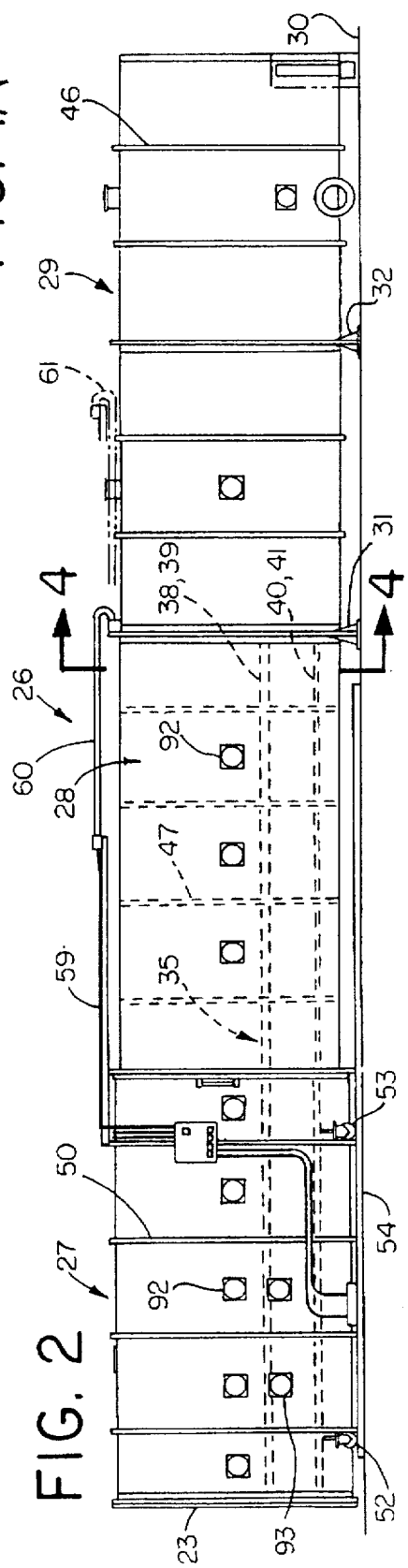

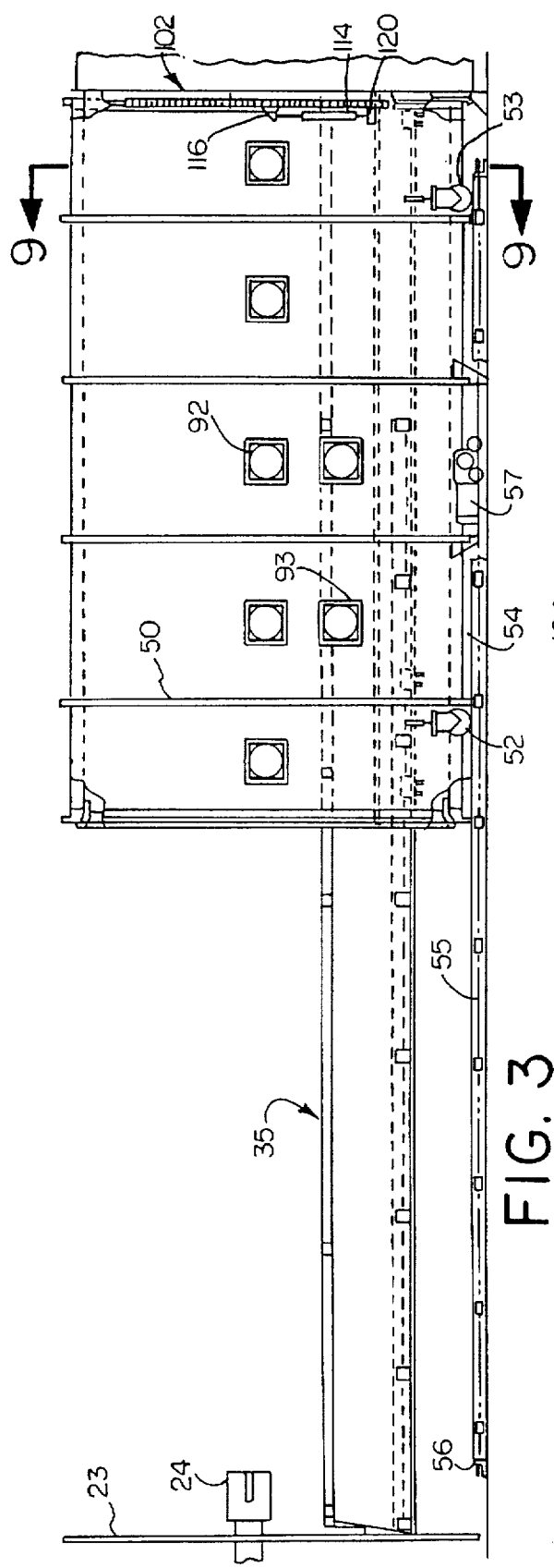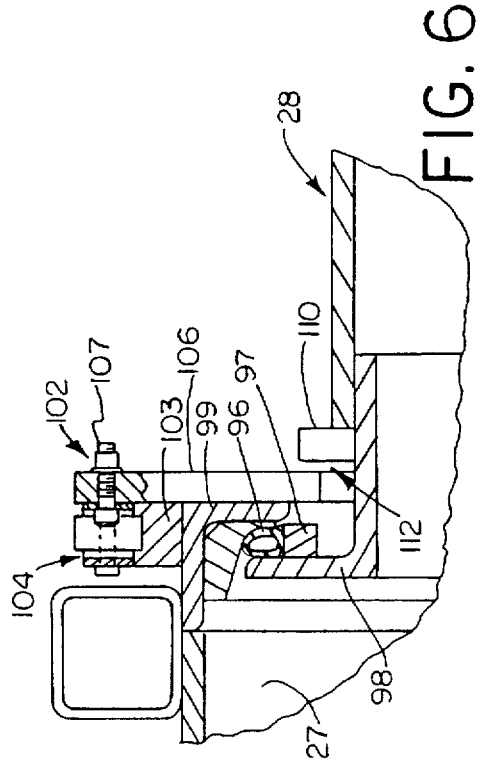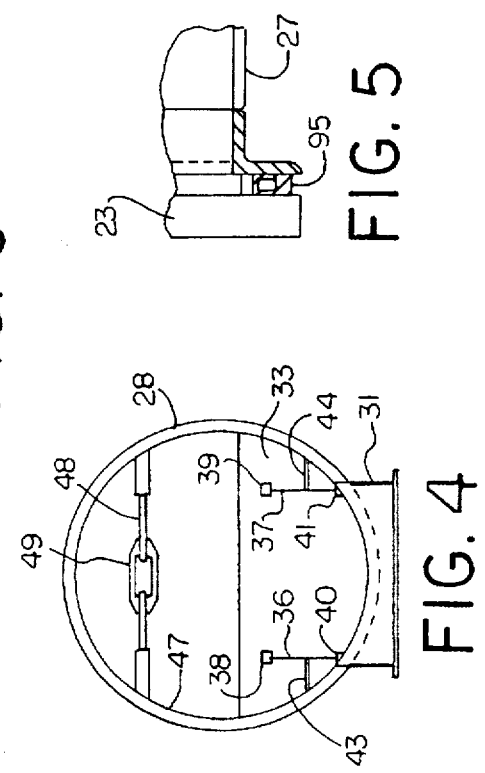

VACUUM EXTRUSION SYSTEM AND METHOD

DISCLOSURE

This invention relates generally as indicated to a vacuum extrusion system and method, and more particularly to certain improvements in a horizontal continuous vacuum extrusion apparatus and method of the type shown in Pagan U.S. Pat. No. 4,783,291.

BACKGROUND OF THE INVENTION

High quality low density foam products are widely commercially made by the inclined barometric leg process. Such products are sold under the well known trademark FOAMULAR® by Owens Corning of Toledo, Ohio, U.S.A. Such products are produced commercially by extruding a plastic melt into an inclined barometric leg which is in the form of a large diameter pipe made of reinforced concrete sections which, when joined and sealed, form a vacuum chamber. The pipe, which is of substantial length, extends on a slope into a pond of water. When the chamber is under vacuum, water is drawn into the pipe at least partially to fill the chamber. The upper end of the chamber is closed by a movable large bulkhead or plate which seals against the upper end of the leg. An extrusion die is mounted on the inside of the plate while one or more extruders are mounted outside the plate. Downstream of the die there is provided shaping, sizing, and haul-off equipment which may be sizeable and complex. When properly shaped and sized, all under vacuum, the extrudate moves down the leg and enters the pond. The pond of water serves not only to seal the vacuum chamber but also cool the extrudate by immersion. The inclined configuration permits the extrudate to exit to atmosphere on a continuous basis through a large radius curvature with the aid of a belt conveyor. The foam extrudate is then cut to length and trimmed outside the pond and chamber. Examples of such installations are shown in U.S. Pat. Nos. 3,704,083, 4,044,084, 4,199,310, 4,234,529, 4,247,276 and 4,271,107.

One of the many disadvantages of the barometric leg is the size and cost of construction. The chamber is constructed on a sizable slope and the extruders, dies, shaping mechanisms, as well as the raw materials must all be at the higher elevation.

Attempts have been made to employ horizontal vacuum chambers such as seen in U.S. Pat. Nos. 4,487,731 and 4,486,369. These systems utilize relatively inefficient spray cooling and also utilize a cut-off operating inside the chamber. Cut-offs usually produce the equivalent of plastic sawdust which is more of a problem inside the chamber. The cut-off product then exits the vacuum chamber through one or more exit chambers. The exit chambers must continuously be recycled from vacuum to atmospheric pressure to vacuum, and be provided with sealed doors also alternating in the cycles, as well as conveyors, all of which are subject to malfunction. Such lines usually cannot maintain their continuity for long uninterrupted periods. For economic efficiency, such lines should operate days or weeks without interruption, or essentially continuously.

Other types of vacuum extrusion apparatus may be seen in U.S. Pat. Nos. 1,990,434, 2,987,768, 3,584,108, and 3,822,331.

In European Patent Publication 0260948A3, the foamed extrudate is optionally cooled by a fluid spray 28 in vacuum zone 10. From the vacuum chamber the extrudate passes through seal means 16 (elements 18 and 19) into a liquid reservoir zone 20. Complex seals are designed to minimize leakage, but liquid that does enter the vacuum zone will fall to the lowest point and excessive accumulation of liquid is either drained away or recirculated to the liquid reservoir. The board is not run through a pond inside or at one end of the vacuum chamber, before passing into the liquid reservoir and then to atmosphere.

European Patent Publication 0260949A3 discloses a fluidized vacuum seal between a vacuum chamber and a liquid reservoir. The seal is a continuous lower belt 20 and a continuous upper belt 40 designed to seal the major faces of the product as the product moves from the chamber into the reservoir. The purpose is to minimize liquid seepage into the vacuum chamber. Even the minor faces are provided with complex cam or inflatable seals, again to minimize liquid seepage. In the vacuum chamber the foam is cooled with a water spray. That seepage which does occur and any water spray is removed with the aid of a pump.

The aforenoted Pagan U.S. Pat. No. 4,783,291 on the other hand, creates a water baffle which divides the exit pond into a section within the vacuum chamber and a section outside the vacuum chamber at atmospheric pressure. The level of the pond section within the chamber is contained by a dam and is higher than the level outside the vacuum chamber. The extrudate is caused to dip over the dam and enter the pond for full immersion cooling. The extrudate passes from the chamber underwater through a controlled orifice to enter the section outside the chamber and then to emerge to atmosphere for cutting and trimming. Water in the pond flows continuously around the extrudate at the orifice moving from the pond section at atmospheric pressure to the pond section within the chamber. Because of the vacuum, the pond section level within the chamber is higher than it is in the atmospheric section. The pond section in the vacuum chamber is maintained just below the dam by continuously circulating water from the interior higher level pond sections to the exterior or atmospheric pond section.

In Pagan, the bulkhead at the end of the chamber on which the die is mounted may be moved away from the end of the chamber to provide access to the interior of the chamber and particularly that section between the bulkhead and dam which contains the sometimes complex shaping, calibration and haul-off machinery. The retraction of the bulkhead when the vacuum is off provides access to the chamber, but as though one were entering a tunnel.

Also, for sizable extrudate and other complex shapes, the length of the chamber between the bulkhead and dam should be substantial and rigid since the machinery involved is sizeable, heavy, and powered. Entering such an area crowded with machinery as though climbing into a tunnel is neither efficient nor satisfactory.

It would therefore be desirable if the machine axis distance between the dam and bulkhead within the chamber could be lengthened and strengthened, and that access to such section of the vacuum chamber be made easy and convenient, all without compromising the integrity of the chamber.

It would also be desirable physically to shorten the pressure chamber yet effectively lengthen the section of the pond within the vacuum chamber, while at the same time permitting the extrudate to enter the atmospheric section of the pond as closely as possible to the bottom of that section. This would minimize the length of the pressure vessel which forms the vacuum chamber and reduce the overall volume of the chamber while still enabling effective immersion cooling. It would also be desirable if a more compact drive for the extrudate could be provided at the orifice to counter the flow of water through the orifice to push the extrudate into the atmospheric section of the pond while at the same time maintaining proper extrudate-orifice alignment and compensating for variations in extrudate thickness. It would also be desirable to have a simplified control system which would regulate the flow of water leaving the vacuum section of the pond to be volumetrically equal to the amount of water entering through the orifice, and to have a simplified control system where the water level control is independent of the vacuum system.

SUMMARY OF THE INVENTION

A vacuum extrusion line utilizes a horizontal barometric leg which includes a vacuum chamber having a fixed bulkhead and an axial spaced dam, with a support truss extending therebetween. The chamber includes a fixed section in which the dam is formed and which also forms a portion of a pond. Various shaping and calibration machinery is mounted on the truss. A die is mounted on the interior of the fixed bulkhead. One or more extruders are mounted at the exterior of the bulkhead and connected to the die through the bulkhead.

In addition to the fixed section, the vacuum chamber includes a telescoping section which moves toward and away from the fixed bulkhead. The telescoping section provides ready access to the die and the machinery supported on the truss. The telescoping section is provided with pressurizable seals effectively and properly to seal the opposite ends of such section against the fixed bulkhead and one end of the fixed section. A chain driven girdling lock is fluid power driven physically to lock the telescoping and fixed sections together when the chamber is closed and before the seals are pressurized.

The fixed section at the other end includes a vacuum chamber higher level section of a pond. An atmospheric section of the pond extends from such other end, and a low profile hood extends from such other end of the chamber into the atmospheric pond section. The projecting narrow end of the hood is close to the bottom of the atmospheric section of the pond. The hood is sealed to the chamber other end and also includes an adjustable orifice through which the extrudate passes to go from the chamber section of the pond to the atmospheric section. The hood further includes a tractor and idler belt conveyor for the extrudate. The tractor or powered conveyor is on top of the extrudate and in fixed alignment with the top edge of the orifice. The bottom belt conveyor is adjustable depending on the thickness of the extrudate and the conveyor frame forms an adjustable lower edge of the orifice. Adjustable gates may be employed to control the width of the orifice. In this manner, the water rushing through the orifice from the atmospheric pond section to the chamber pond section can be controlled.

The amount of water circulated or forced back to the atmospheric pond is obtained by a proper capacity pump forcing water through a control valve back to the atmospheric section of the pond. A level control device set below the top of the dam operates the control valve regulating the amount of water flowing back to the atmospheric section. The pump has sufficient capacity and operates continuously. The set point is the water level in the chamber and the control valve simply adjustably restricts the pump's output. Although the amount of water moving is related to the vacuum level, the vacuum system operates independently.

When the chamber is closed, locked, and sealed, and the line is operating the extrudate moves from the die through the shaping and calibration equipment, over the dam and into the pond, through the tractor and idler conveyor in the hood, through the orifice against the flow of water and enters the atmospheric pond section, moving under the projecting lip of the hood near the bottom of the atmospheric pond section. The extrudate is guided upwardly through a large radius to a blow-off and haul-off. The extrudate is then cut and trimmed for packaging and shipment. The extrudate, after passing through the shaping and calibration equipment, is powered only by the tractor belt in the hood and the haul-off.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a partial elevation of a vacuum extrusion line in accordance with the present invention;

FIG. 1A is a broken downstream continuation of FIG. 1;

FIG. 2 is an enlarged side elevation of the vacuum chamber, showing it closed;

FIG. 3 is a fragmentary elevation showing the chamber open;

FIG. 4 is a section taken on the line 4—4 of FIG. 3 showing dam and truss;

FIG. 5 is an enlarged radial fragmentary section showing the seal between the telescoping section and bulkhead;

FIG. 6 is a similar further enlarged fragmentary radial section showing the seal and lock between the fixed and telescoping sections;

DETAILED DESCRIPTION OF THE PREFERRED EMBODIMENTS

Figure 7:
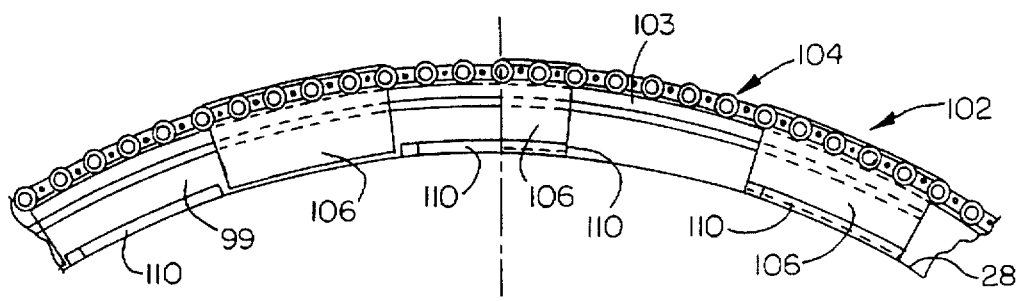
FIG. 7 is an enlarged fragmentary view of the lock and its chain drive; the left hand side showing the lock open; the right showing it closed.

Referring initially to FIGS. 1 and 1A there is illustrated a vacuum foam extrusion line in accordance with the present invention. The extrusion line, shown generally at 20, includes at one end one or more extruders shown generally at 21, which receive raw materials at 22, forming such materials into a hot plastic melt. For the production of foams, a blowing agent will be included. The extruders 21 are mounted on the exterior of a fixed circular bulkhead 23 while a connected extrusion die 24 is on the interior of the bulkhead.

The extrusion die 24 is inside a vacuum chamber shown generally at 26. The vacuum chamber 26 is comprised of three generally tubular sections of approximately equal length shown at 27, 28 and 29, respectively. The sections 28 and 29 are fixedly supported on the floor 30 as indicated by the stanchions 31 and 32, the former being the point of demarcation between the two fixed sections of the vacuum chamber. Also at such point of demarcation is a semicircular dam plate 33 which is shown more clearly in FIG. 4. Extending from the dam plate 33 to the fixed bulkhead 23 is a truss shown generally at 35. The details of the truss are shown more clearly in FIG. 4. The truss may comprise two parallel plate beams, each having a rectangular tubular top chord as seen at 38 and 39, respectively. Each beam includes a bottom chord seen at 40 and 41, respectively. The bottom chords are secured to the interior of the fixed section 28 while the beams are laterally braced with respect to such fixed section as indicated at 43 and 44, respectively in FIG. 4. The fixed section 28 is thus rigidly internally secured to the truss 35 and is not supported from the floor other than by the stanchion at 35 at one end and the truss extending through the fixed section 28 to the fixed bulkhead 23.

Referring now additionally to FIGS. 2, 3 and 4 it will be seen that the various sections of the vacuum chamber are in the form of relatively large diameter tubular structures. The inside diameter of the tubular sections may be 3 to 4 meters or more depending upon the size and configuration of the extrudate being formed.

The sections differ slightly from each other in that the fixed section 29 has exterior stiffening rings seen at 46, while the fixed section 28 has interior stiffening rings seen at 47. This permits the exterior of the section 28 to be smooth and unobstructed. The interior stiffening rings may be provided with reinforcing tie rods indicated at 48, the tension of which is adjustable through turnbuckle 49. The telescoping section 47 has a smooth interior and exterior stiffening rings 50. The telescoping section is mounted on wheels seen at 52 and 53 in FIGS. 2 and 3 which are supported on laterally spaced rails 54. A drive chain 55 seen in FIG. 3 anchored at 56 and driven by motor 57 is operative to move the telescoping section 27 toward and away from the fixed bulkhead 23 telescoping over the fixed section 28 of the vacuum chamber. The motor and chain drive move the telescoping section in much the same manner as an automatic garage door.

It is noted that the truss 35 is not connected to the telescoping section. Accordingly, the telescoping section not only telescopes around the smooth exterior of the section 28 but also around the truss projecting from the dam through the fixed section to the fixed bulkhead 23.

As seen more clearly in FIG. 2, power is supplied to the telescoping section 27 through the projecting arm 59 and flexible power track 60 which assumes the position seen in phantom lines at 61 in FIG. 2 when the vacuum chamber 27 is open or telescoped over the fixed section 28.

Reverting now to FIGS. 1 and 1A, it will be seen that the extrudate formed by the die 24 in the vacuum chamber passes through a forming mechanism seen at 62, and calibration tables seen at 63 and 64. The calibration tables comprise a large number of top and bottom powered rollers seen at 65. The forming mechanism, as well as the calibration tables 63 and 64 may be mounted on wheels seen at 66 to ride along rails 67 which may be a portion of the truss such as the bottom chord members.

For more details of a type of die which may be employed with the present invention, reference may be had to U.S. Pat. No. 4,395,214 to Phipps et al. Also, examples of shaping and calibration equipment may be seen in prior U.S. Pat. Nos. 4,247,276, 4,395,214, and for 4,469,652.

From the calibration equipment, the foam extrudate passes over the top edge of the dam 33 and moves beneath a series of idler rollers 70 arranged in a large radius arc to be directed downwardly into a pond section 72 formed in the chamber section 29 and extending from the dam 33 to an orifice shown generally at 74 in a hood 75 which projects from the end 76 of the vacuum chamber section 29 into atmospheric pond section 78. The extrudate exits the lower end of the hood shown at 79 and passes beneath a set of idler rollers 81 which guide the extrudate onto ramp 82 to exit from the pond section 78 to atmosphere. The extrudate then passes through a blow-off to remove water from the extrudate through a haul-off 84, through a cutoff 85, and onto table 86 for stacking and shipping. The haul-off 84 is a series of powered pinch rollers with light pressure which pull the extrudate to the right as seen in FIG. 1A.

The only other power for the extrudate between the calibration equipment 64 and the haul-off 84 is the powered conveyor shown at 88 in the hood 75. The powered conveyer belt 88 cooperates with an idler conveyer belt 89 below the extrudate to push the extrudate through the orifice 74 to exit the vacuum chamber. The haul-off coordinates the movement of the extrudate from the orifice through the atmospheric pond section 78, through the blow-off, and into the cutoff 85. It is noted that the idler rollers 70 and 81 are arranged in the form of a large radius arc to cause the extrudate to dip into the pond section 72 which as seen in FIGS. 1 and 1A is at a considerably higher level than the pond section 78, exposed to atmosphere. The radius of the curvature depends upon the thickness and material of the extrudate being produced. A radius of curvature on the order of about 40 to about 50 meters is normally acceptable for foam polystyrene board.

Figure 9:
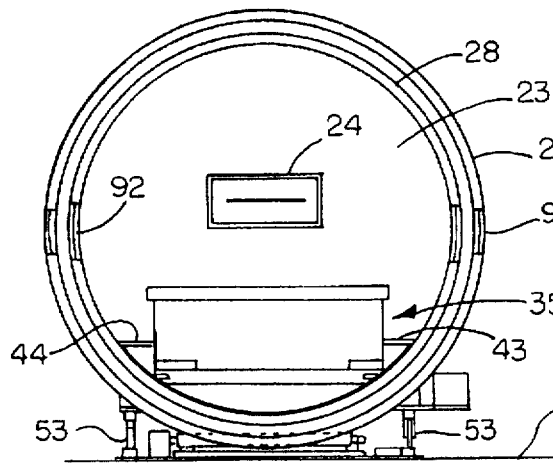
FIG. 9 is a sectional view taken from the line 9—9 of FIG. 3.

Referring now additionally to FIGS. 5 and 9 it will be seen that the telescoping section 27 is slightly larger than the adjacent fixed section 28 and telescopes over the outside of the fixed section. Both sections are provided with a number of portholes seen at 92. The portholes are simply sealed transparent panes which enable someone outside the vacuum chamber to see inside. The interior will be lighted through the power supply 60. The telescoping section has portholes that have two different levels, the lower level being shown at 93. The fixed section 29 containing pond section 72 also has portholes fewer in number but at both levels. When the telescoping section 27 is closed it will be sealed against the fixed bulkhead by pressurizable seal 95 seen in FIG. 5. Also, as seen in FIG. 6, the telescoping section 27 is sealed against the fixed section 28 by pressurizable seal 96. The seal is positioned on ring 97 on flange ring 98 projecting from the fixed section 28. When pressurized it will press against flange ring 99 mounted on the end of the telescoping section 27. It can be seen that when both seals are pressurized the telescoping section 27 would tend to move to the right as seen in FIGS. 5 and 6 or away from the bulkhead 23.

In order to provide the proper reaction for pressurizable seals to function correctly to seal the telescoping chamber when closed, a girdling lock is provided between the telescoping end fixed sections as shown generally at 102. As seen also in FIGS. 3, 7 and 8, the flange ring 79 includes an annular track 103 which supports the rollers of roller chain 104 which completely girdles the end of the telescoping section away from the bulkhead 23. A series of keeper plates 106 are mounted on the outside of the roller chain by the fasteners seen at 107, such plates extending radially inwardly flush with both the roller chain track 103 and the inwardly extending flange of the flange ring 99.

Figure 8:
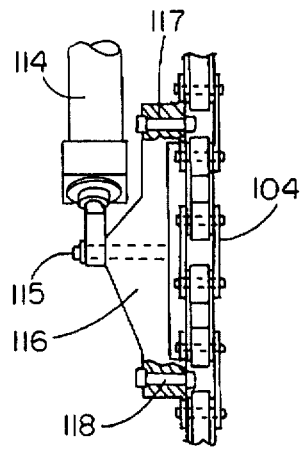
FIG. 8 is a fragmentary elevation of the chain drive.

The keeper plates 106 extend radially inwardly beyond the radial extent of stop projections 110 which are mounted on the end of the fixed section 28. As seen more clearly in FIG. 7, the stop projections 110 are circumferentially spaced as are the keeper plates 106. There is a stop projection for each keeper plate. On the left-hand side of FIG. 7 the lock is shown in the open position and each keeper plate is positioned between adjacent stop projections 110 with some axial clearance. This permits the axial movement of the telescoping section with respect to the fixed section. In the closed or locked position, however, as seen on the right-hand side of FIG. 7, the keeper plates 106 have moved radially to become aligned with the stop projections 110 so that axial movement of the telescoping section is now limited by the interference engagement between the keeper plates and the stop projections. Thus, FIGS. 5 and 6 display the seal prior to expansion. With the keeper plates 106 in the locked position, the expansion or pressurization of the seals 95 and 96 will cause the telescoping section to move away from the bulkhead 23 but only to the limited extent permitted by the radial clearance between the keeper plate and stop projection as seen at 112 in FIG. 6. It can be seen that movement of the chain just a few degrees will lock the telescoping section to the fixed section, and movement in the opposite direction will unlock the sections. Such movement is obtained by fluid piston cylinder assemblies as seen in FIGS. 3 and 8. The rods of such piston cylinder assemblies may be pivoted at 115 to bracket 116 which spans several links of the change 104 and is fastened to such links by the fasteners indicated at 117 and 118. The blind end of each cylinder assembly 114 is mounted on a bracket 120 to the exterior of the wall of the telescoping chamber segment. There may be two such piston cylinder assemblies driving the chain on opposite sides of the telescoping section. In any event, the chain can readily be moved a short distance, moving the keepers from the unlocked clear position seen in the left-hand side of FIG. 7, to the locked interfering position seen on the right-hand side of FIG. 7 and vice versa. When locked, the pressurizable seals can be properly expanded to provide an effective vacuum seal at end of the telescoping section.

Figure 10:
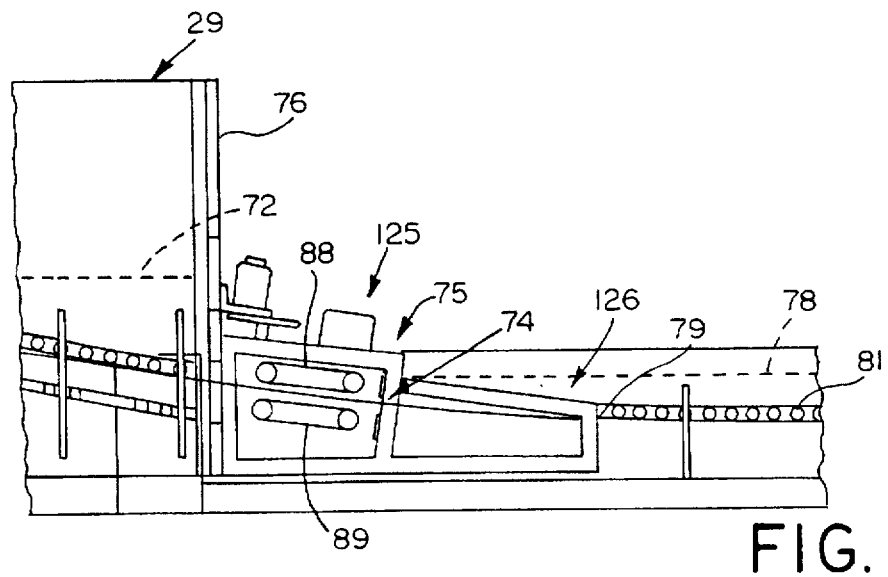
FIG. 10 is a fragmentary view showing the transition hood on the end of the chamber.
Figure 11:
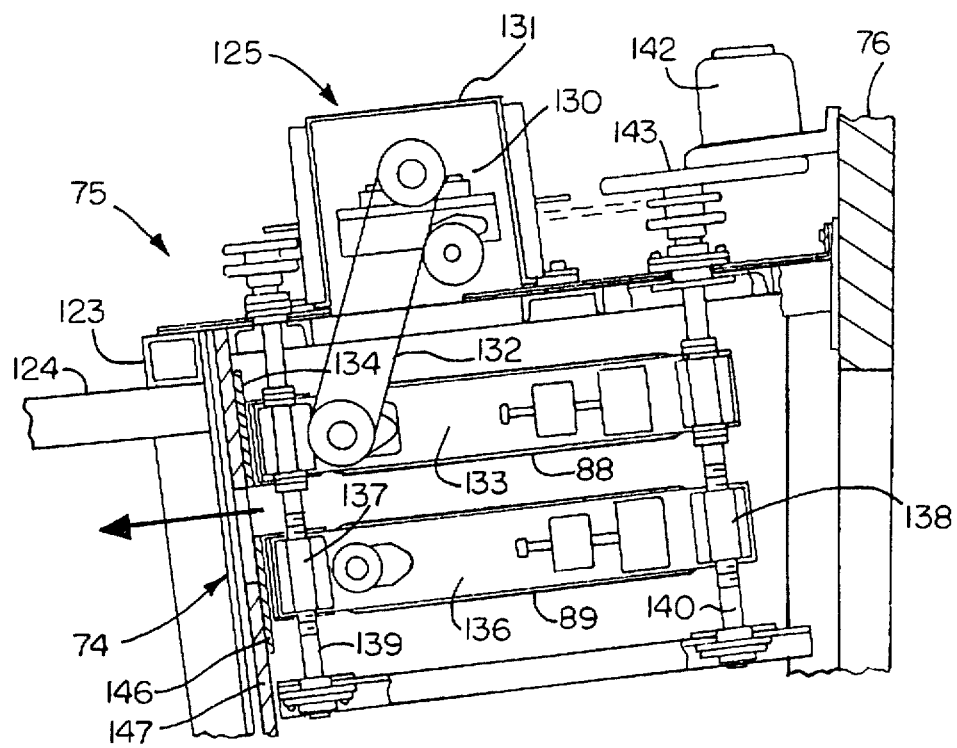
FIG. 11 is a fragmentary detail of the tractor and guide conveyor in the hood to push the extrudate through the orifice.
Figure 12:
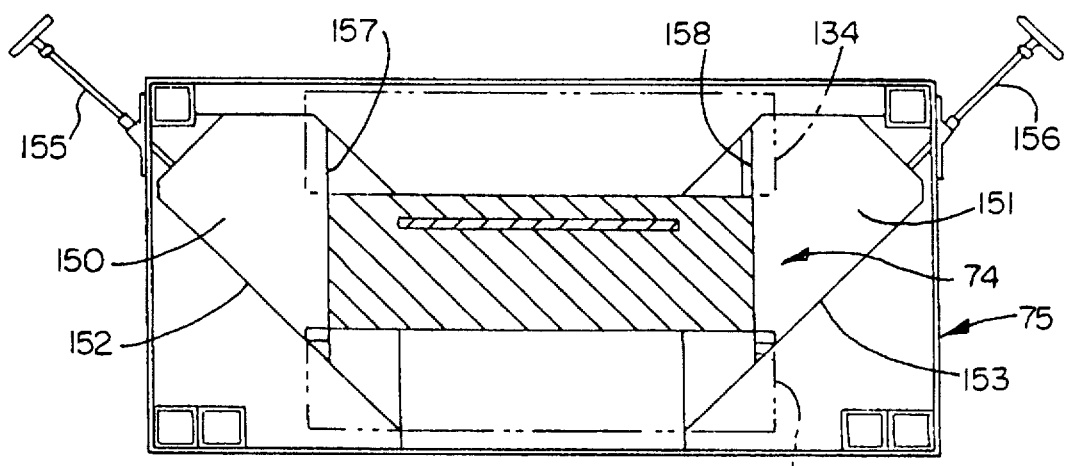
FIG. 12 is a view of the orifice in the hood illustrating the adjustments available.

Referring now to FIGS. 10, 11 and 12, it will be seen that the hood 75 fixed to the end 76 of the fixed vacuum chamber section 29 projects into the lower atmospheric pond section 78 and comprises a frame formed of rectangular tubular members such as indicated at 123 and 124. The hood as fabricated includes two slightly inclined sections with the upper section 125 being shown in detail in FIG. 11, while the lower section 126 simply projects downwardly into the pond section 78 so that the extrudate passes into the outside or atmospheric pond section at substantially the nadir of its large radius arc. The section 125 houses the tractor conveyor 88 and the idler conveyer 89. The tractor conveyor is powered by the drive unit 130 seen in enclosure 131. The tractor conveyer belt 88 is driven through the transmission 132, and is mounted on frame 133 which is normally designed to be in an adjusted position and which at its front includes a shield plate 134 which is substantially flush against the plate 135 forming the upper edge of the orifice 74.

The idler conveyor belt 89 is also mounted in a frame seen at 136. At its four corners it is supported by nuts seen at 137 and 138 which are threaded on externally threaded corner shafts 139 and 140. The corner shafts are driven synchronously for rotation through motor 142 through the transmission 143 so that the lower idler conveyor section 89 may be moved toward and away from the tractor belt 88. The motor is controlled on delay by an extrudate thickness sensor. The delay is controlled by the extrudate speed. Like the frame 133, the frame 136 is provided with a shield plate 146.

Preferably the tractor belt 88 is situated so that under surface of the belt against which the extrudate floats is aimed substantially at or just below the lower edge of the exit orifice 74. However, the lower or idler belt 89 is adjustable as to the thickness of the extrudate and on a continuous basis.

To enlarge or reduce the lateral edges of the orifice closure plates 150 and 151 are mounted on inclined ramps or guides seen at 152 and 153. The plates may be adjusted through adjustment screws 155 and 156, respectively, which project upwardly from the hood on each side. The adjustment screws may of course be motorized and operated in the same manner as the idler belt. In any event the edge forming plates have vertical edges seen at 157 and 158, respectively, which adjustably form the lateral edges of the orifice. As noted, the tractor belt 88 is the only power source for the extrudate between the calibration tables within the vacuum chamber and the haul-off 84 in atmosphere seen in FIG. 1A. The tractor belt or conveyor 88 literally pushes the extrudate through the orifice 74 and helps to control the size of the orifice thus limiting the water rushing through the orifice from the atmospheric side to the higher level vacuum chamber side. It is however important that there be adequate clearance at the orifice to ensure against extrudate hang-up.

The hood is a unit which makes the tractor conveyer and the orifice controls more readily available and with easier access. The utilization of the hood has a number of advantages and it can readily be mounted on and removed from the end of the vacuum chamber. The panels which close the hood may be transparent for visual access to the interior thereof, or include windows. The hood not only extends the nadir of the arc but also provides a separate unit for the tractor conveyor and idle conveyor as well as the controls for both the conveyor and the orifice adjustments.

Figure 13:
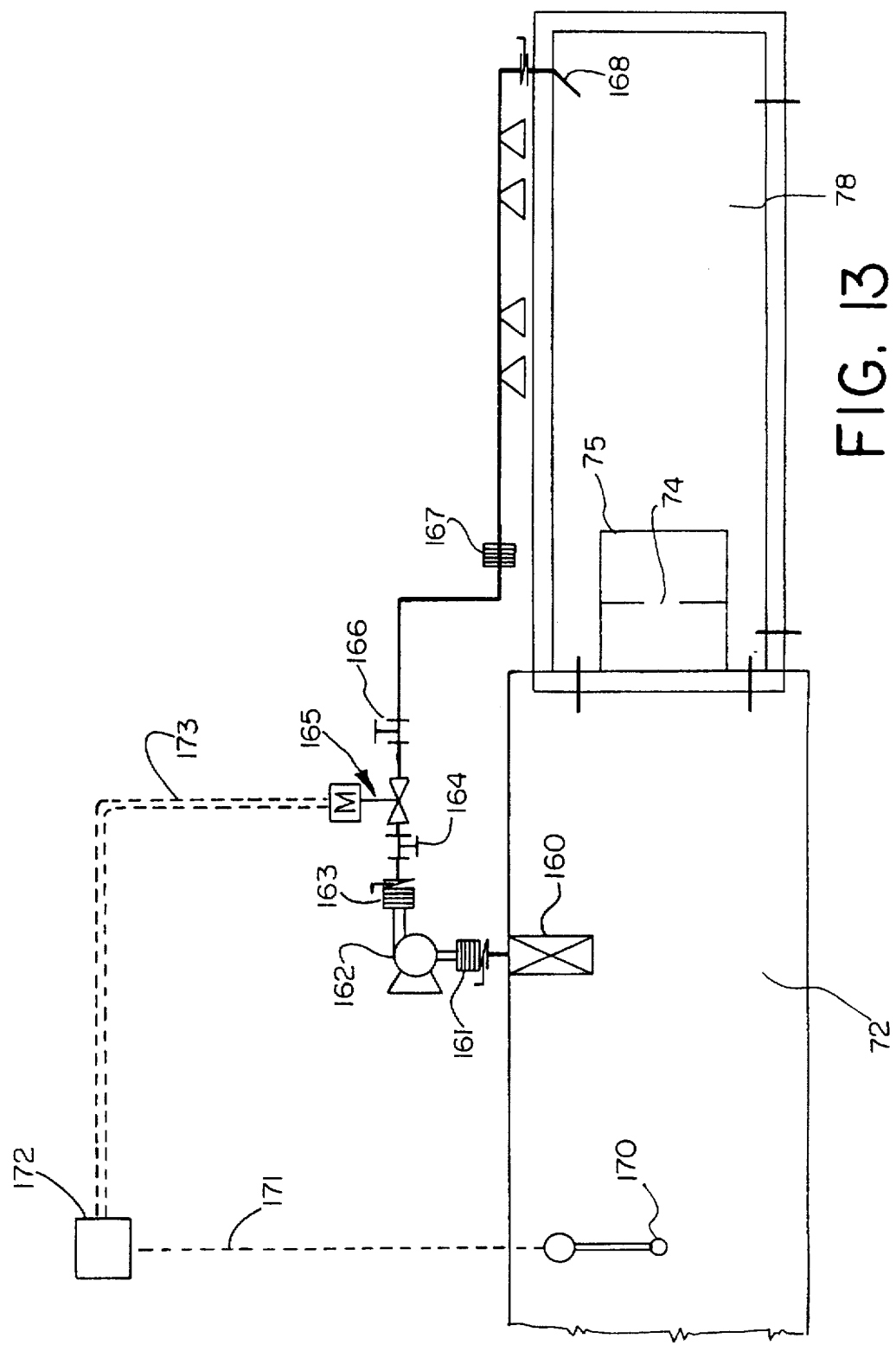
FIG. 13 is a schematic illustration of the water circulation system.

Referring now to FIG. 13 there is illustrated the water circulation system for circulating the water between the upper or vacuum chamber section of the pond 72 and the lower or atmospheric section of the pond seen at 78. Water is drawn from the pond section 72 through a vortex break 160, a butterfly valve with an expansion joint 161, and into the intake of pump 162. From the pump, the water passes a butterfly valve with an expansion joint 163, through a saddle tee 164, and through control valve 165. From the control valve the water passes through saddle tee 166, expansion sleeve 167, and back into the pond section 78 as indicated at 168. The water is introduced into the pond section 78 remotely from the orifice 74, which interconnects the pond sections.

When the water in the vacuum chamber pond section 72 reaches the appropriate level below the dam 33, it actuates a level sensor indicated at 170 connected at 171 to control module 172. The control module 172 operates on a continuous basis to open and close the control valve 165, through the connections 173.

During operation of the system the pump has sufficient capacity and operates continuously. The set point is the water level in the vacuum chamber and the control valve adjustably restricts the pump output. Although the amount of water moving is related to the vacuum level, the vacuum system operates independently.

When the chamber is closed, locked and sealed, and the line is operating continuously, the extrudate moves through the die and foaming takes place in the vacuum chamber. The extrudate while foaming moves through the shaping and calibration equipment and over the top of the dam 33 and into the higher level full immersion pond in the vacuum chamber. The extrudate exits the vacuum chamber by being pushed through the orifice by the tractor belt conveyer in the hood. The extrudate is pushed against the flow of water, and enters the atmospheric pond section, moving under the projecting lip of the hood near the bottom of the atmospheric pond section. The extrudate is guided upwardly through the large radius curvature to a blow-off and the haul-off. The extrudate is then cut and trimmed for packing and shipping. After passing through the shaping and calibration equipment, the extrudate is powered only by the tractor belt in the hood pushing the extrudate through the orifice, and the haul-off, just before the extrudate is cut to length.

We claim:

1. A vacuum extrusion line comprising an extruder, a vacuum chamber having die within the chamber at one end and an extrudate water baffle cooler at the other end of said chamber, for extracting the extrudate to atmosphere for cutting and stacking, said chamber having at least two sections, one section telescoping with respect to the other section to open and close the chamber.

2. A vacuum extrusion line as set forth in claim 1, including pressure seals at both ends of said telescoping section.

3. A vacuum extrusion line as set forth in claim 2 including a fixed bulkhead at said one end of said chamber against which said telescoping one section abuts when the chamber is closed.

4. A vacuum extrusion line as set forth in claim 3 wherein said pressure seals are between said telescoping section and bulkhead and between said telescoping one section and the other section.

5. A vacuum extrusion line as set forth in claim 4 including means to lock said telescoping one section and the other section against relative movement when the chamber is closed and before the seals are pressurized and the chamber evacuated.

6. A vacuum chamber as set forth in claim 5 including a dam in said other section and a truss extending from said dam to said fixed bulkhead around which said one section telescopes.

7. A vacuum extrusion line as set forth in claim 6 wherein said extrusion die is mounted interiorly of said fixed bulkhead, and shaping and calibration equipment mounted on said truss.

8. A vacuum extrusion line as set forth in claim 7 including a vacuum chamber pond of water at one level when said chamber is evacuated behind said dam into which the extrudate passes, and an atmospheric pond of water at another lower level beyond the chamber, and an underwater orifice between said ponds through which the extrudate passes from one pond to the other.

9. A vacuum extrusion line as set forth in claim 8 including a hood on the end of the vacuum chamber projecting into the atmospheric pond.

10. A vacuum extrusion line as set forth in claim 9 wherein said orifice is in said hood.

11. A vacuum extrusion line as set forth in claim 10 including an upper conveyor above said extrudate in said hood to guide the extrudate through the orifice.

12. A vacuum extrusion line as set forth in claim 11 wherein said upper conveyor is aligned with the top edge of the orifice.

13. A vacuum extrusion line as set forth in claim 12 including an idler conveyor beneath said upper conveyor at said orifice in the hood, and means to move the idler conveyor vertically in response to the thickness of the extrudate.

14. An extrusion line comprising an extruder, a horizontal vacuum chamber, an extrusion die inside the chamber forming an extrudate, an interior vacuum chamber pond at one level and an exterior atmospheric pond at another lower level, a submerged hood extending from said chamber into said atmospheric pond operative to direct the extrudate to said atmospheric pond before exiting to atmosphere, and a controlled orifice in said hood closely accommodating the extrudate as it moves from the vacuum chamber pond to the atmospheric pond.

15. An extrusion line as set forth in claim 14 including a guide conveyor for the extrudate in said hood adjacent the orifice operative to guide the extrudate through the orifice.

16. An extrusion line as set forth in claim 15 wherein said guide conveyor is aimed at the top edge of the orifice.

17. An extrusion line as set forth in claim 16 including an idler conveyor means beneath said guide conveyor to engage the bottom of the extrudate, and means to move the idler conveyor means toward and away from the guide conveyor in response to the thickness of the extrudate.

18. An extrusion line as set forth in claim 17 including a plate on the front of said idler conveyor means forming the lower edge of orifice.

19. An extrusion line as set forth in claim 18 including means in said hood to adjust the width of the orifice.

20. A vacuum extrusion line comprising an extruder, a vacuum chamber, an extrusion die within the chamber forming an extrudate, a pond of liquid through which said extrudate passes having a portion at one level in said chamber and another portion at a lower level outside said chamber, and means to circulate liquid from the portion of the pond within the chamber to the portion outside the chamber independently of the movement of the extrudate, and control means continuously to regulate the amount of water circulated, said control means being responsive to the one level of the pond within the chamber.

21. A vacuum extrusion line as set forth in claim 20 wherein said means to circulate comprises a pump, and the control means a valve operated by a level sensor inside the vacuum chamber.

22. A vacuum extrusion line as set forth in claim 21 wherein said pond portions are elongated and of substantially uniform width, the pond portion outside the chamber being substantially longer than the pond portion inside the chamber.

23. A vacuum extrusion line as set forth in claim 22 wherein the pond portion in the chamber is contained between a dam and a vacuum chamber hood extension projecting into the pond portion outside the chamber.

24. A continuous extrusion line comprising an extruder, a bulkhead, an extrusion die mounted inside the bulkhead, a pond forming dam, a structural beam extending from the dam to the bulkhead for supporting shaping and sizing apparatus, a vacuum chamber comprising a fixed section surrounding said dam, and a telescoping section of said vacuum chamber around said beam adapted to move away from and toward the bulkhead to open and close the chamber.

25. An extrusion line as set forth in claim 24 wherein said structural beam comprises spaced parallel girders.

26. A method of preparing foam plastic comprising the steps of extruding a foamable plastic melt into a vacuum chamber, passing the foaming extrudate into a body of liquid which has a higher level portion within and a lower level portion outside such chamber to exit the chamber through such body of liquid, controlling the higher level of that portion of the body of liquid within such chamber by continuously circulating liquid from that portion of the body of liquid within such chamber, and controlling the amount of liquid continuously circulated in response to the higher liquid level within the chamber.

27. The method of claim 26 including the step of circulating liquid from that portion of the body of liquid within such chamber to that portion outside such chamber.

28. The method of claim 26 wherein the amount of liquid circulated is controlled by a valve on the output side of a circulating pump.

29. A method of extruding plastic foam comprising the steps of extruding a foamable plastic melt into an elongated vacuum chamber at one end thereof and to exit such chamber through an exit orifice at the other end, such exit orifice being submerged in a body of liquid having a higher level portion inside said chamber and a lower level portion outside said chamber, and continuously circulating such liquid from said higher level portion inside the chamber to said lower level portion outside the chamber to maintain the higher level of liquid inside said chamber, with the amount of liquid being circulated controlled by the higher level within the chamber.

30. A method as set forth in claim 29 including the step of controlling the output of a circulating pump to control the level of liquid within the chamber.

31. A method as set forth in claim 30 including the step of controlling the amount of liquid circulated independently of the vacuum level.

32. A method as set forth in claim 29 including the step of forming the chamber with a fixed and telescoping section.

33. A method as set forth in claim 32 including a fixed bulkhead supporting the die, and pressure sealing the telescoping section to the fixed section and bulkhead when closed.

34. A method as set forth in claim 33 including the step of locking the fixed and telescoping sections before pressure sealing.

35. A foam extrusion method comprising the steps of using a horizontally extending vacuum chamber with an extrusion die at one end of said chamber forming a foam extrudate, passing the extrudate through water baffle means at the opposite end of said chamber operative to enable said chamber to be maintained under vacuum as the extrudate exits to atmosphere, and forming said vacuum chamber with a fixed and telescoping chamber section.

36. A foam extrusion method as set forth in claim 35 wherein said chamber sections are cylindrical.

37. A foam extrusion method as set forth in claim 36 wherein said telescoping section fits over at least a portion of said fixed section.

38. A foam extrusion method as set forth in claim 35 including a fixed bulkhead, and pressure sealing the telescoping section to the fixed section and the bulkhead when closed, and before evacuation of said chamber.

39. A foam extrusion method as set forth in claim 38 including the step of locking the fixed and telescoping sections before pressure sealing.

40. A foam extrusion method as set forth in claim 39 including the step of girdling the end of the telescoping section away from the bulkhead with circumferentially spaced keepers, and rotating the keepers axially to interfit with projections on said fixed section to lock the telescoping section and fixed section.

41. A foam extrusion method as set forth in claim 40 including the step of interconnecting the keepers with a chain girdling the telescoping section, and driving the chain to move the keepers.

42. A method as set forth in claim 41 including the step of moving the chain with a fluid operated piston-cylinder.

43. A continuous extrusion line as set forth in claim 24 wherein said telescoping section when closed extends from the fixed section to the bulkhead.

44. A continuous extrusion line comprising an extruder, a vacuum chamber including an upstream bulkhead, an extrusion die for forming an extrudate on the interior of said upstream bulkhead, a downstream bulkhead, a structural beam extending between said bulkheads along the line, and at least two vacuum chamber sections surrounding said beam, one of said sections being movable parallel to the beam to open and close the vacuum chamber.

45. A continuous extrusion line as set forth in claim 44 wherein said one of said sections telescopes over the other.

46. A continuous extrusion line as set forth in claim 44 including tracks supporting said one of said sections for such telescoping movement.

47. A continuous extrusion line as set forth in claim 44 including tracks on said structural beam, and downstream equipment for said extrudate supported on said tracks within the vacuum chamber, and surrounded by said one section when the vacuum chamber is closed.

48. A continuous extrusion line as set forth in claim 44 wherein said downstream bulkhead is a dam containing a water baffle for cooling of the extrudate and continuous removal of the extrudate from the chamber.

* * * * *